Figure 6:
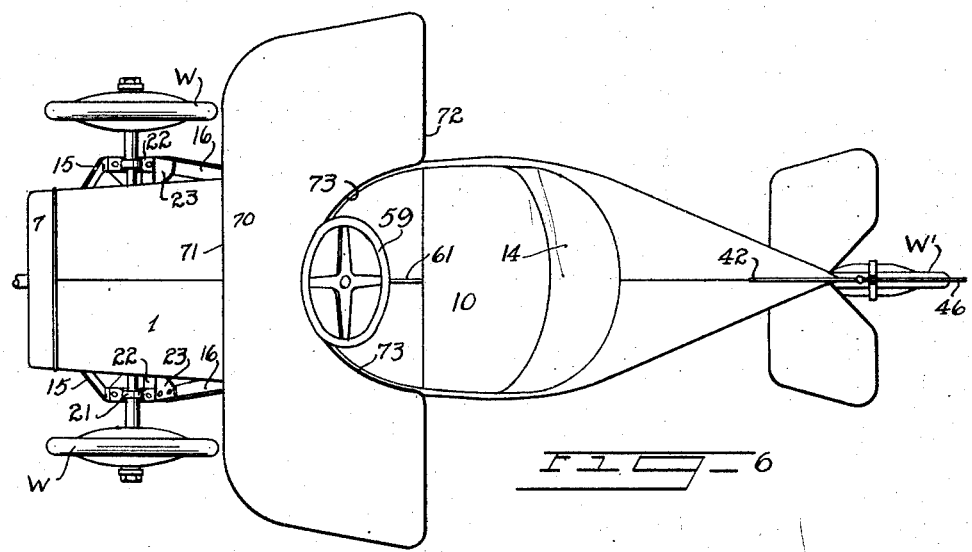

April 15, 1930.   H. L. KRAEFT   1,754,430
JUVENILE AIRPLANE CONSTRUCTION
Filed June 9, 1928   3 Sheets-Sheet 1
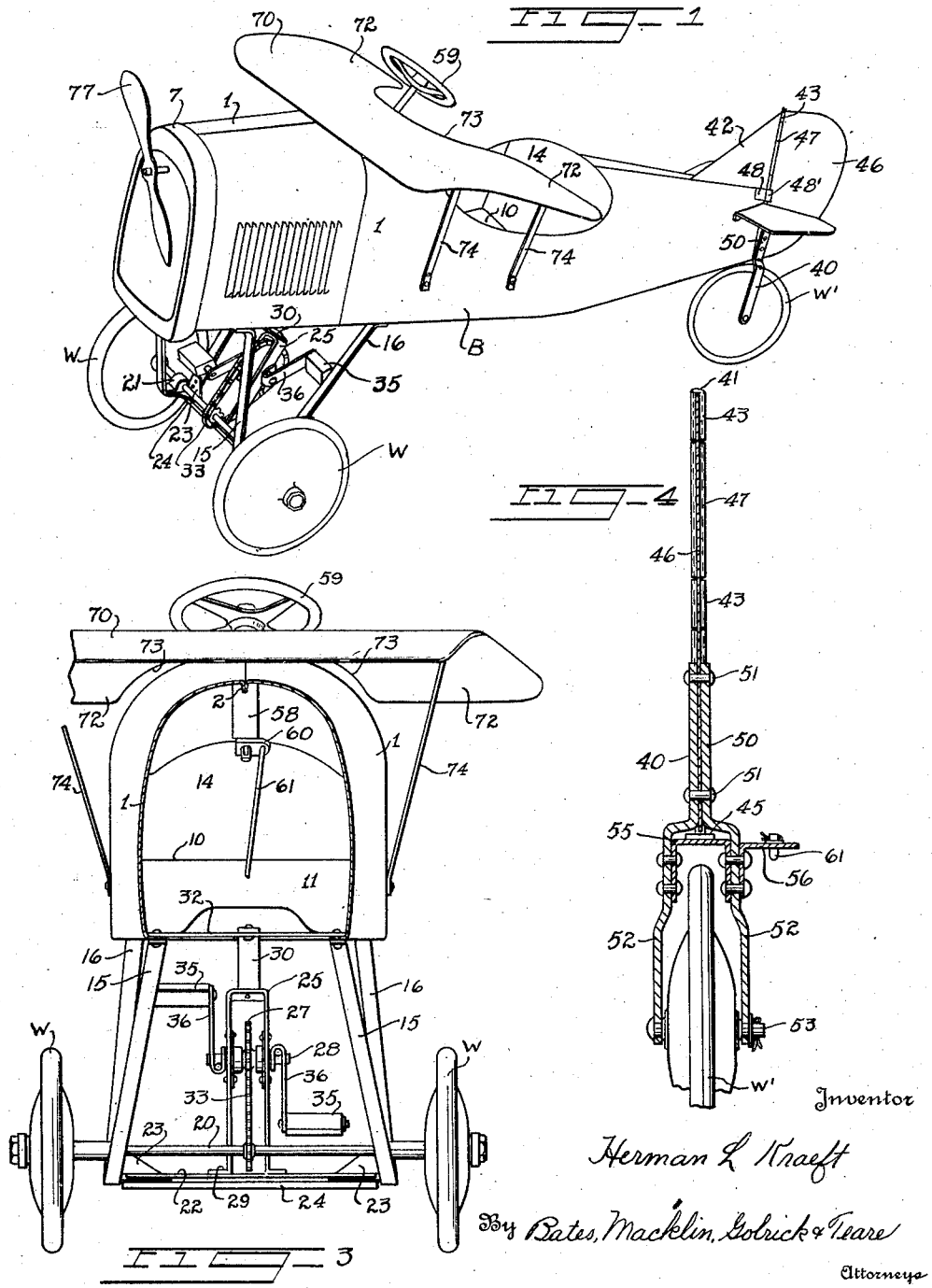

April 15, 1930.  H. L. KRAEFT  1,754,430
JUVENILE AIRPLANE CONSTRUCTION
Filed June 9, 1928   3 Sheets-Sheet 2
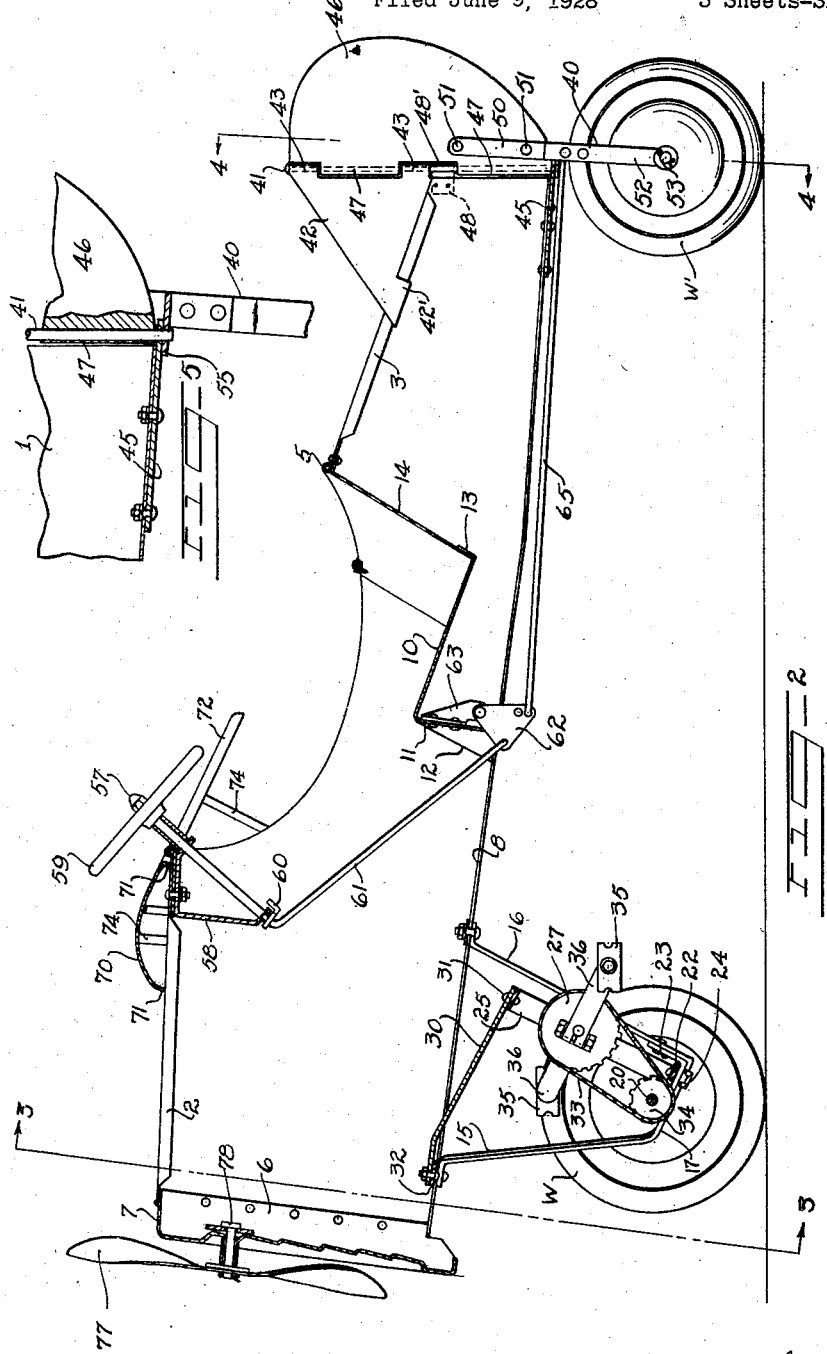

April 15, 1930.                H. L. KRAEFT                1,754,430
                        JUVENILE AIRPLANE CONSTRUCTION
                    Filed June 9, 1928        3 Sheets-Sheet 3

Inventor
Herman L. Kraeft
By Bates, Macklin, Golrick & Teare
Attorneys

Patented Apr. 15, 1930

1,754,430

UNITED STATES PATENT OFFICE

HERMAN L. KRAEFT, OF CLEVELAND, OHIO, ASSIGNOR TO THE MURRAY OHIO MANUFACTURING COMPANY, OF CLEVELAND, OHIO, A CORPORATION OF OHIO

JUVENILE AIRPLANE CONSTRUCTION

Application filed June 9, 1928. Serial No. 284,159.

This invention relates to a juvenile vehicle construction, particularly to a pedal driven toy airplane. An object of the invention is to provide a strong but economically manufactured vehicle construction closely simulating a full sized vehicle, such as an airplane, wherein the child shall have free bodily movement to drive and steer the vehicle.

A further object is to provide an over-driving gearing arrangement for a juvenile vehicle, in which the driving gearing is strongly supported and so arranged as not to interfere with the free movement of the child, or be likely to harm such child or his clothing in any way.

A further object is to provide an effective and simple mechanism for steering a juvenile vehicle of the pedal driven airplane type.

Further objects include the provision of a childs' vehicle simulating an airplane wherein the wing structure shall be pleasing in appearance, simple to construct, and which will effectively blend into the lines of the vehicle body.

Further objects and features of the invention will become apparent from the following description relating to the accompanying drawings. The essential characteristics are summarized in the claims.

In the manufacture of wheeled vehicles, various driving arrangements have been previously proposed including the usual pump type, pedal drive, as well as various sprocket drive arrangements. In the provision of driving gearing for what is known as the "pump" type, no serious problems of clearance for the child's legs are encountered because of the simplicity for this form of drive. However, when it is attempted to provide an over-gear arrangement, using a straight driving axle and a sprocket chain, then the problem of leg and foot clearance is considerable because of the necessary braces etc. to support the pedal drive. My invention, as suggested in the above objects, is essentially concerned with this problem.

The essential thought in arranging the elements of the pedal drive mechanism forming the subject matter of this application, is that the support for the sprocket wheel and pedal shaft should be very rigid in order to withstand shock and abuse, and at the same time keep the necessary frame parts in compact arrangement, and well out of the way of the child's feet. In this connection, steering as well as driving the vehicle presents a similar problem. The logical arrangement for steering a vehicle of the airplane type, includes the provision of a pivoted rear wheel, either single or double, as desired. Obviously, the child's body is between this rear wheel and the hand control, such as a steering post, or lever. It has been proposed to lead the connecting arrangement, as between a steering post and pivoted rear wheel, alongside the child's body, but I have considerably simplified the steering mechanism by placing all of the parts centrally of the vehicle, while amply clearing the child's body to avoid harming or cramping the child, as will be more fully appreciated from the following description.

Figure 8:
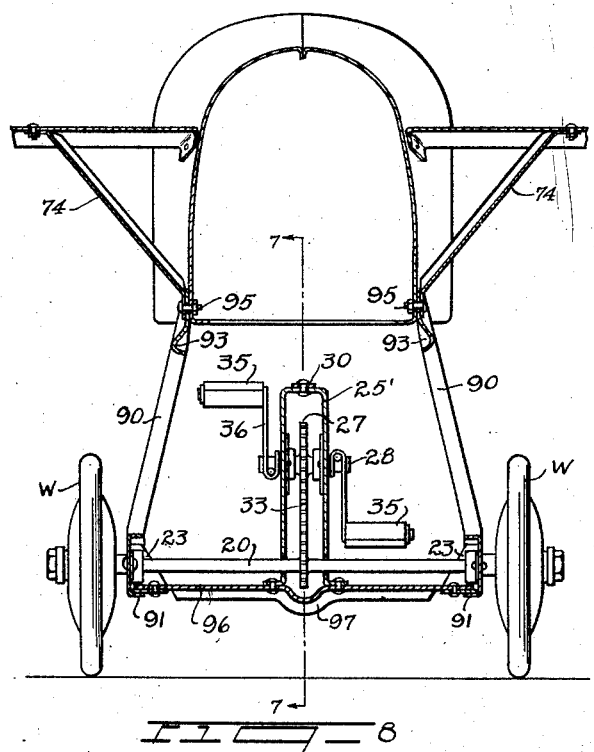
Figure 7:
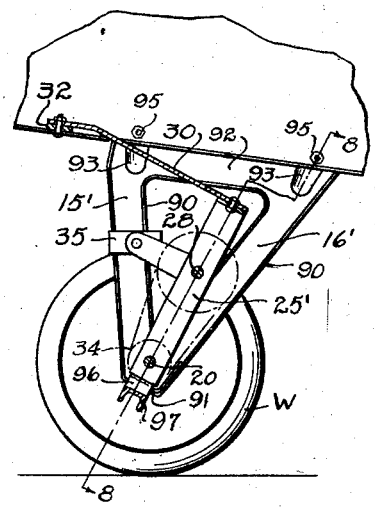

In the drawings, Fig. 1 is a perspective view of the vehicle; Fig. 2 is a substantially central longitudinal sectional view thereof; Fig. 3 is a sectional fragmentary front elevation, as indicated by the line 3—3 on Fig. 2; Fig. 4 is a sectional detail view as indicated by the line 4—4 on Fig. 2; Fig. 5 is an enlarged fragmentary sectional detail view of the rear steering wheel support and associated parts of the vehicle; Fig. 6 is a plan view showing particularly the shape of the body and the correlation of the body opening and wing structure; Fig. 7 is a detailed fragmentary sectional view taken substantially along the line 7—7 in Fig. 8 showing a modified form of sprocket drive and axle support; and Fig. 8 is a fragmentary transverse cross-sectional view as indicated by the line 8—8 in Fig. 7.

Referring in detail to the drawings, the body B comprises two main and substantially identical body side members 1 which are curved inwardly toward each other at the top of the body and joined as by means of flanges 2 and 3. The body is closed at the top, except for an enlarged central opening preferably rounded on all sides and beaded as at 5. This affords a seat opening through which the child enters the body. The body side members are braced at the front end of the body by a sheet metal radiator-like member 6 having substantially continuous rearwardly extending flanges 7 which underlie the front edges of the member 1, and to which the flanges may be secured as by riveting or welding, rivets being shown. The body is substantially open entirely across the bottom, but the side members are flanged inwardly as at 8 for strength and to provide for attaching the running gear of the vehicle. A seat structure is formed by a seat bottom member proper designated 10 which has a depending forward flange 11 fastened as by angle extensions 12 to the sides 1, and a rear flange 13 which overlaps the bottom edge of a seat back member 14 extending across the body and substantially conforming to the shape of the top opening.

The pedal drive for the vehicle consists of an over-geared sprocket and chain arrangement, one sprocket being provided with pedals within reach of the child's feet as he sits on the seat member 10. The arrangement is made to provide adequate clearance for his feet, and this is both by reason of the bracket arrangement for supporting the front wheels and axle, and by reason of the support arrangement for the sprockets and pedal shaft.

As shown, there are a pair of generally V-shaped brackets, one at each side of the vehicle, and comprising strip metal members having downwardly extending legs 15 and 16, the top ends of the legs being respectively flanged forwardly and rearwardly and secured to the flanges 8 of the side body members. At the bottom of each V, the strip is bent in two places to afford an attachment portion 17 for a cross brace and a supporting seat for axle shaft bearings.

In Fig. 3 it will be noted that both leg portions of each bracket extend outwardly from the body, partly for better bracing effect, but mainly to afford more room for the child's feet and legs.

The axle 20 has a pair of wheels W of any suitable type, at least one being rigid with the axle. The axle is journaled in bearing supports 21 resting on the portion 17 of the V-shaped brackets. Connecting the bottom portions of the brackets is a cross brace formed, as shown, of a substantially flat strip 22 connected by angle plates 23 to the bracket portions 16 and 17, and directly below the member 22 is a channel-shaped structural member 24 secured to both the angle plates 23 and the cross bar 22. Rising from the plate 22 and secured thereto as by bolts or rivets is a comparatively thin central support, including a part 25, passing on each side of the driving sprocket 27 and supporting a sprocket and pedal shaft 28. This member 25 is preferably a U-shaped strip of metal having portions disposed at each side of the sprocket 27 and flanged at the bottom as at 29 for attachment to the bar 22.

In order to brace the member 25 and support it from the body, I preferably provide a strip metal member 30 attached to the top portion of the member 25, as by a rivet 31, and which extends forwardly to a cross bar 32 overlying the flanges 8 of the body and the flanged ends of the bracket legs 15, the bar 32, and these flanged ends being mutually secured together, as by bolts or rivets. The members 25 and 30 of the sprocket drive support cooperate to guard against injury of the child or his clothing by the sprockets and chain.

The sprocket 27 is in permanent driving relation to the axle by reason of a sprocket chain 33 passing over a sprocket wheel 34 rigid on the axle. Pedals 35 are shown as rigidly attached to the shaft 28 as by means of sheet metal arms 36.

The forces resulting from pedaling by the child are for the most part transmitted by the member 25 substantially along the direction of impartation of such forces to points closely adjacent the ends of the bracket portions 16 and in a direction parallel to these portions, hence, most of these driving forces are taken up by the various members without likelihood of twisting or bending the members. It will be noted particularly that the members 16 extend downwardly from about the normal position of the child's knees, hence, there is little tendency to shift the lower ends of the bracket members 16 forwardly or rearwardly in pedaling, which might throw considerable abnormal compressive strain on the members 15. The portion 30 of the support acts mainly as a stiffener and positioner for the support portion 25.

In Figs. 7 and 8, I show a modification in which the main brackets for supporting the axle 20 comprise pressed sheet metal members having leg portions 15' and 16'. The edges of the leg portions of the bracket are flanged inwardly as at 90, the outermost flange continuing from one leg to the other as at 91. In order to provide flat areas for attachment to the body side members, I stamp portions of the bracket inwardly as at 93. Suitable struts or brackets 74 for the plane may be connected to the body in overlying relation to the depressed portions 93 as by the bolts 95, which, as shown, fasten the brackets to the body.

The cross connecting members 22 and 24 of Fig. 3 are, in the construction of Figs. 7 and 8, supplanted by a single channel shaped cross brace 96 which may lie directly beneath the axle and curve downwardly as at 97 to avoid the lower sprocket 34. The sprocket supporting member, corresponding to part 25 of Fig. 3, herein designated 25', may have openings through it to receive the axle 20. The suspending and bracing member 30 may be substantially the same as in the previously described construction.

An important feature of the invention is the dirigible wheel support, an embodiment of which is shown particularly in Figs. 2, 4 and 5. In providing a single pivoted wheel for steering purposes, either at the front or back of the vehicle, it is important, in order to make the vehicle steer easily and avoid wear on the tire of the wheel, to have the wheel pivot substantially about its point of tangency with the surface on which the vehicle runs. The usual arrangement for obtaining this relationship of the wheel to the ground consists in providing a fork, the upper end of which forms the pivot pin. This is expensive and, as a commercially practicable structure, is not usually strong enough to withstand the strains, due to abuse of the vehicle by the child. The present arrangement is unusually simple from a manufacturing standpoint, and results in a surprisingly sturdy structure.

As shown, a single rear wheel W' is supported on a fork 40 which pivots about the axis of a substantially vertical rod or pivot pin 41 carried at the extreme rear end of the body. The rod passes downwardly through separated curled-over portions 43 of a fixed rudder-like sheet metal member 42 and similar portions 47 of a swingable rudder-like sheet metal tail piece 46. The rod may have a head formed to rest on the uppermost curled over portion 43 for holding it in place. The main lateral support for the rod 41 comprises a gusset plate 45 secured to the flanges 8 and having an opening for receiving the rod, and a bifurcated clip 48 which embraces the rod at 48' between curled-over portions of the members 42 and 46. The clip and gusset plate function to rigidly secure the side members 1 together, as well as to support the rod. The part 42 of the rudder-like arrangement is additionally held in position by a trapezoidal extension 42' embraced and held between the flanges 3 of the body side members 1. One of the flanges may be cut away, where it would otherwise overlie the trapezoidal extension, in order to form an interlock between the body and web member 42.

A simple construction for the fork 40 comprises two substantially identical flat metal strips 50 which lie flat against the member 46 in mutually overlying relation, being secured together and to the plate as by through rivets 51. The members 50 below the rudder member are bent outwardly as at 52 to form the legs of the fork. The lower ends of the portions 52 embrace the axle 53 of the wheel. To form a reinforced connection between the fork and the body, as well as to brace the fork, I provide a U-shaped bracket 55 secured to both portions 52 of the fork and having a forwardly extending lip underlapping the rear end of the gusset plate 45 and perforated to receive the pin 41.

In Fig. 2 it will be seen that the pivot axis passes slightly forwardly of the axis of the wheel. It follows that the swinging of the fork 40 and plate 46 about the pivot results in turning the wheel about a point very close to but slightly forwardly from the point of tangency between the wheel and the ground line. The result is a slight caster effect which, while it does not interfere with the free turning of the wheel, tends to hold the vehicle in a straight course, irrespective of attention by the child. Obviously, by a slight increase in the angle between the pivot axis and the strip members 50, the axis of the wheel may be made to intersect the pivot axis, in which case the wheel would turn on the true tangent point of the wheel.

In order to swing the fork 40 to steer the vehicle, the fork has a laterally extending arm 56, and to this arm is connected linkage passing substantially centrally of the body and forwardly to a steering post 57, the latter being carried by a bracket 58, which is secured within and to the top side of the body. The post may have the usual wheel 59 rigid therewith, and at its lower end an arm 60 to which is connected a link 61 passing downwardly to a horizontally pivoted bell-crank 62 depending from a bracket 63 secured to the flange 11 of the seat structure. The bell-crank is connected by a link 65 to the arm 56 of the steering fork. By reason of the bell-crank and linkage, very little power is lost in communicating the motion of the steering post to the dirigible wheel support, and the arrangement affords ample clearance for the child's legs, which straddle the link member 51.

The vehicle shown resembles an aircraft of the monoplane type, and in order that the plane part of the vehicle shall be rigidly braced and pleasing in appearance, I form the plane of a single piece of sheet metal 70 which may rest on the top of the body forwardly from the seat opening. The plane has rearward extensions 72 at each side and close to the child in driving position. The rear central portion of the plane is cut out in a curve as at 73. Fig. 6, particularly, shows the manner in which the cut-out portion 73 follows parallel to the edge of the seat opening. As shown, the margin line of the plane is slightly forwardly of the opening for the sake of better appearance and in order to guard against possibility of tearing the child's clothing. All edges of the plane 70 are preferably flanged downwardly as at 71 in a comparatively generous curve. The advantage of such flanging, over the usual scheme of beading the edges, is that portions of the plane, such as at the outermost ends of the projections 72 may be made fairly pointed, whereas, in beading the edges, a very gradual curve must necessarily result.

In order to further simulate the appearance of an airplane, the vehicle is provided with a freely turnable propeller mounted on a bar 78 secured to the front panel members 7 of the body. Preferably the propeller is simply loose on its shaft 78, so that it may be driven by air currents in the manner of a windmill, as the vehicle is propelled.

I claim:

1. In a child's wheeled vehicle, a body simulating the fuselage of an airplane, said body having a top opening and being recessed to receive the child in sitting position, a front drive construction comprising brackets extending downwardly from the body sides forwardly of the body of the child, a driving axle supported by the brackets, a pedal driving mechanism, within reach of the feet of the child in the aforesaid position, including a pedal shaft, sprockets and a chain, one sprocket being arranged to turn with the pedal shaft, the axis of the shaft being above the axle, and there being a support depending from the body substantially centrally thereof and having a rigid connection at its lower end with said brackets, for supporting said driving mechanism.

2. A juvenile vehicle construction comprising a hollow body arranged to support a child in sitting position, a pair of front frame members extending downwardly, one at each side of the body, an axle carried by said brackets, and a cross brace connecting the brackets, there being a chain drive including a pedal shaft, together with a chain and sprockets drivingly connecting the shaft with the axle, a thin central support for the pedal shaft extending upwardly from and connected with the cross brace, and adapted to be straddled by such child's legs, said support having its upper end connected to and suspendingly supported by the body.

3. A juvenile vehicle airplane construction comprising a hollow body substantially open at the bottom and closed at the top, there being an opening in the top and means below the opening affording a seat for the child, forward frame members at each side and below the body, a front axle supported by said frame members, cross bracing means subtending said frame members adjacent the axle, a forwardly disposed sprocket drive within reach of the feet of the child occupying said seat and including a sprocket wheel and pedals directly connected thereto, and bracket means for supporting the sprocket wheel, rigidly carried by the cross bracing means.

4. A juvenile vehicle construction, comprising, a body, a pair of open frames extending downwardly from respective sides of the body and secured to the bottom edges thereof, an axle carried by said brackets, and a cross brace running substantially parallel to the axle and connecting the brackets, there being a chain drive including a pedal shaft and sprockets drivingly connecting the shaft with the axle, a central support for the pedal shaft extending upwardly and rearwardly from the cross brace, said support then extending upwardly from the pedal shaft and being connected to the body.

5. A juvenile airplane construction and driving means therefor, comprising, a hollow body open at the bottom and substantially closed at the top, except for a seat opening, open V-shaped brackets at the sides of the body and flaring outwardly therefrom to provide leg clearance for the child, a driving axle supported by the brackets, cross bracing means running substantially parallel to the axle and adjacent thereto for connecting the brackets, there being a pedal drive including a pair of sprocket wheels and a pedal shaft coaxial with and connected to one of said wheels, a support for said shaft comprising metal members connected to the cross bracing means and extending on opposite sides of said wheels centrally of the vehicle, and substantially rigid means on the body suspendingly supporting said metal members.

6. A juvenile vehicle construction comprising a body, frame members at each side and below the body at its forward end, an axle supported by said frame members, a cross brace subtending said frame members adjacent to and substantially parallel to the axle, a sprocket drive for said axle including sprocket wheels, a chain and pedals directly connected to one of the wheels, and means for supporting the latter wheel comprising a pair of bearing supporting members extending upwardly from the cross brace at each side of said latter wheel.

7. In a child's vehicle, a body having spaced sides, a top opening, and a cross member forming a seat below said opening, pedal mechanism forwardly of the seat and within reach of the feet of a child occupying such seat, and a pair of wheels one being arranged to be driven by the pedal mechanism, a single rear steering wheel and pivotal support therefor, and a steering gear comprising a downwardly extending shaft adjacent the top opening and adapted to be turned by such child, there being an arm rigid with the shaft, linkage connecting the arm with the steering wheel and passing downwardly and rearwardly substantially centrally of the body beneath the seat, then substantially horizontally and rearwardly to said steering wheel, there being an arm on the wheel support, operatively connected to said linkage.

8. In a juvenile vehicle, a hollow body substantially open at the bottom and having a seat opening intermediately of the ends thereof, a cross member below the opening, connecting the sides of the body and forming the seat proper, a pair of front wheels and mechanism operable by a child occupying the seat for driving one of the wheels, a rear steering wheel and pivotal support therefor, a steering post forwardly of the seat and having an arm at its lower end, and linkage connecting the arm of the post with said rear wheel support, said linkage passing substantially centrally of the body downwardly beneath the seat and then rearwardly to said support.

9. In a juvenile airplane construction, a body having a seat structure intermediately of the ends thereof, a pair of front wheels, one being a traction wheel, and means whereby the child may operate the same to drive the vehicle while occupying the seat, a single pivotally mounted rear wheel, including a laterally extending arm, a steering post intermediately of the ends of the body and adapted to be turned by the child when occupying said seat, there being a link arranged for reciprocation by said post and passing centrally of the body and rearwardly from the steering post, a bell crank operating in a vertical plane and connected to the link and supported by the body seat structure, there being another link connecting the bell crank with said arm.

10. In a juvenile airplane, a sheet metal body closed at the top but having a seat opening intermediately of the ends thereof, front and rear wheels below said body, and means for driving one of said wheels, there being a wing structure comprising a continuous member extending over the top of the body forwardly of such seat opening, and positioned close to the top of the body at its front edge and connected to the body, said wing member having rearward extensions free from the body and projecting beyond said seat opening and inclining downwardly.

11. In a juvenile airplane, a body having a seat opening at the top, and a seat structure below said opening, there being a wing structure comprising a single piece of sheet metal extending across the top of the body and resting thereon at its front edge, the rear edges of said wing member being extended rearwardly around the opening and inclined downwardly at each side of the body.

12. In a juvenile airplane, a hollow body having an upwardly facing seat opening rounded at its front portion, and a seat structure below said opening, there being a wing structure comprising a single piece of sheet metal extending across the top of the body and rigidly connected thereto, the rear edge of the wing having a rounded central cutout portion substantially conforming to the said front portion of the seat opening and providing rearward wing extensions, the latter inclining downwardly and rearwardly past the front edge of the opening.

13. In a juvenile vehicle, a body, an axle and front wheels supported by the body, and means for driving one of the front wheels, a rear wheel for steering the vehicle, and means supporting the wheel comprising a substantially vertically disposed rod carried at the rear end of the body, a substantially flat plate formed to embrace the rod and pivot about the axis thereof, and a fork in which the wheel is journalled for rotation, said fork having portions rigidly secured to each other and lying on opposite sides of said plate.

14. In a juvenile vehicle of the airplane type, a body having a pair of wheels disposed at the front end thereof, and means for driving one of the wheels, a rear steering wheel and tail construction disposed at the rear end of the body, said construction comprising a substantially vertically disposed rod in vertically fixed position on the body, a rudder-like member comprising a substantially flat plate formed at its front edge to embrace the rod and pivot about the axis thereof, and a fork rotatably carrying the rear wheel, said fork comprising a pair of members secured to the said plate rearwardly from the rod.

15. In a juvenile vehicle of the airplane type, a body, a single rear steering wheel, a substantially vertical rudder-like member pivotally secured to the rear end of the body, and a fork supporting the wheel and rigidly attached to the rudder member, there being a plate rigidly secured to the body and a bracket rigid with the fork, the plate and bracket being pivotally secured together on an axis coincident with that of the rudder member.

16. In a child's vehicle, a body and wheels for supporting the body, means pivotally supporting one of said wheels on a substantially vertical axis, said means including a substantially vertically disposed plate pivoted at the end of the body, and a substantially straight wheel support secured to the plate along an axis intersecting the pivot axis substantially at the ground line.

17. In a wheeled vehicle, a body, a dirigible wheel support comprising a pivot pin carried by the body, a substantially vertically disposed plate pivoted about the pin and supported in axially fixed relation thereto, a wheel supporting member attached to and supported in part by the plate, and a wheel supported by said member, the axis of the wheel being offset rearwardly a slight distance from the axis of the pin.

In testimony whereof, I hereunto affix my signature.

HERMAN L. KRAEFT.